March 25, 1930. M. HEDGLON 1,752,080

FRAME FOR LICENSE PLATES

Filed May 31, 1928

INVENTOR.
Mead Hedglon
BY Parsons & Bodell
ATTORNEYS.

Patented Mar. 25, 1930

1,752,080

UNITED STATES PATENT OFFICE

MEAD HEDGLON, OF SYRACUSE, NEW YORK, ASSIGNOR TO M. L. OBERDORFER BRASS COMPANY, OF SYRACUSE, NEW YORK, A CORPORATION OF NEW YORK

FRAME FOR LICENSE PLATES

Application filed May 31, 1928. Serial No. 281,916.

This invention has for its object a particularly simple and economical frame for the license plates of motor vehicles, which can be readily and snugly applied to the plate so that there is no rattling between the plate and the frame.

The invention consists in the novel features and in the combinations and constructions hereinafter set forth and claimed.

In describing this invention, reference is had to the accompanying drawings in which like characters designate corresponding parts in all the views.

Figure 1:
Figure 1 is a front elevation of this frame showing the same applied to a license plate.
Figure 2:
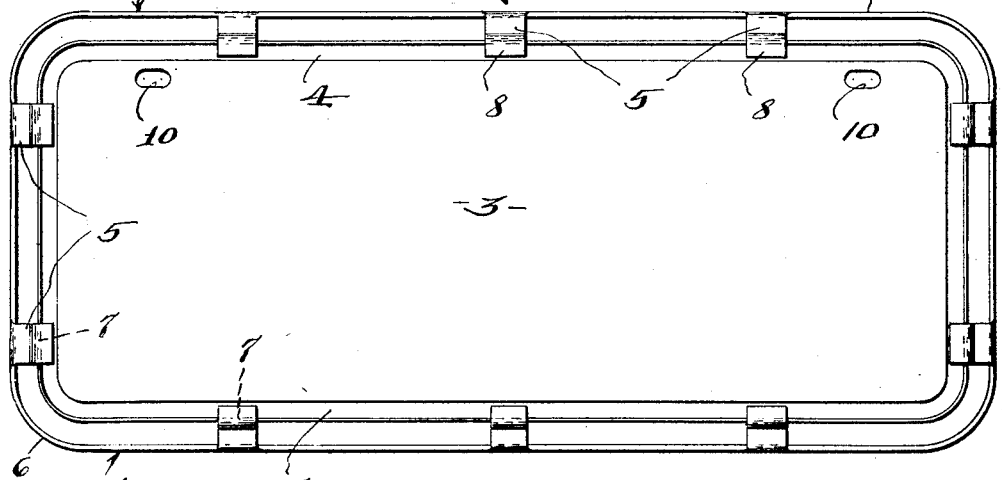
Figure 2 is a rear elevation thereof.

1 designates the frame which is usually formed up of sheet metal as aluminum, the frame being in the form of a channel with the flanges projecting rearwardly. The inner flange 2 of the channel is arranged to press throughout its length on the front face of the margin of the plate 3 and entirely around the plate, this flange 2 engaging the front side of the plate just inside of the corrugation 4 usually provided on license plates around the border thereof.

5 are tabs integral with the frame and projecting at intervals from the outer flange 6 of the channel of the frame, these tabs being bendable inwardly to press against the edge and rear side of the plate. Each tab is formed with an offset 7 between its ends forming a shoulder for pressing against the edge of the plate. The portion 8 of each tab toward the outer end thereof beyond the offset overlies the rear face of the plate adjacent the corrugation 4.

Figure 3:
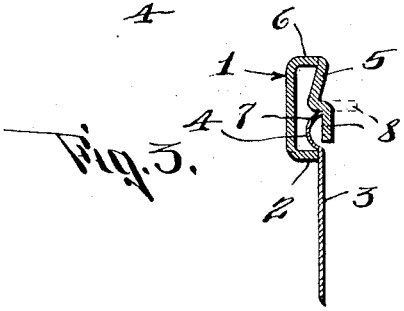
Figure 3 is an enlarged fragmentary sectional view through the frame and the contiguous portion of the plate.

In operation, the tabs stand upright, as shown in dotted lines, Figure 3, the plate 3 is placed on the rear side of the frame, and the corrugation 4 located relatively to the flange 2 as shown in Figure 3, and then the tabs are bent inwardly into full line position, Figure 3, so that the offsets engage the edge of the plate and hold the plate 2 from edgewise movement and portions 8 of the tabs press against the rear face of the plate pressing the plate against the flange 2 so that the plate is held from rattling.

The plate is held in position on the bracket of the automobile in the usual manner as by screws which extend through the slots 10 in the plate.

To change the license plate, the screws are removed thus detaching the license plate with its frame from the vehicle. The tabs 5 are then bent toward upright position permitting the plate to be separated from the frame. The new plate is then inserted and the tabs bent down into their original position.

The license plate with its frame is then attached to the frame by means of screws extending through the slots 10 and into a bracket on the vehicle.

What I claim is:

1. A frame for license plates of motor vehicles, said frame being in the form of a channel with the innermost flange of the channel arranged to engage the front side of the license plate within the edge of the plate, the outer wall of the channel being provided with spaced apart tabs movable into a position extending crosswise of the channel, each tab having an offset forming a shoulder for engaging the edge of the plate, the portion of each tab toward the free end of the tab beyond the offset overlying the rear face of the plate.

2. The combination with a license plate having a marginal corrugation around the same on the front side thereof, of a frame in the form of a channel having one flange thereof arranged to engage the front side of the plate within the corrugation whereby the corrugation extends into the channel and tabs projecting at intervals from the outermost flange of the frame and arranged to extend across the channel, the tabs having shoulders for engaging the edge of the plate and portions for overlying the rear face of the plate.

In testimony whereof, I have hereunto signed my name, at Syracuse, in the county of Onondaga and State of New York, 1928.

MEAD HEDGLON.